United States Patent [19]
Hirata

[11] Patent Number: 5,570,255
[45] Date of Patent: Oct. 29, 1996

[54] OVERCURRENT PREVENTING CIRCUIT

[75] Inventor: Masaru Hirata, Tokyo, Japan

[73] Assignee: NEC Corporation, Tokyo, Japan

[21] Appl. No.: 382,607

[22] Filed: Feb. 2, 1995

[30] Foreign Application Priority Data

Feb. 2, 1994 [JP] Japan .................................. 6-011190

[51] Int. Cl.$^6$ ...................................................... H02H 7/00
[52] U.S. Cl. ............................. 361/18; 361/58; 361/87; 361/93
[58] Field of Search ........................ 361/58, 87, 93, 361/102, 18

[56] References Cited

U.S. PATENT DOCUMENTS

| | | | |
|---|---|---|---|
| 3,686,530 | 8/1972 | Bogut | 361/57 |
| 4,062,051 | 12/1977 | Way | 361/6 |
| 4,412,267 | 10/1983 | Hansen | 361/94 |
| 4,811,153 | 3/1989 | Sakatos | 361/88 |
| 4,819,117 | 4/1989 | Brennan et al. | 361/18 |
| 4,992,340 | 2/1991 | Tidwell et al. | |

FOREIGN PATENT DOCUMENTS

| | | |
|---|---|---|
| 63-53873 | 3/1988 | Japan . |
| 63-50447 | 4/1988 | Japan . |
| 02-62657 | 5/1990 | Japan . |
| 04-14361 | 2/1992 | Japan . |

OTHER PUBLICATIONS

Horowitz et al., "*The Art of Electronics,*" Cambridge University Press, 1990, pp. 142–143.

*Primary Examiner*—Todd Deboer
*Attorney, Agent, or Firm*—Scully, Scott, Murphy & Presser

[57] ABSTRACT

An overcurrent detecting circuit provided within a battery pack detects any overcurrent flowing in a circuit electrically connecting the battery and connection terminals. Upon detection of any overcurrent by this overcurrent detecting circuit, a switch circuit intercepts the electric connection between the battery and the terminals, and opens the so far closed circuit.

12 Claims, 2 Drawing Sheets

OVERCURRENT PREVENTING CIRCUIT

BACKGROUND OF THE INVENTION

1. Field of the Invention

The present invention relates to an overcurrent preventing circuit, and more particularly to an overcurrent preventing circuit which, upon detection of an overcurrent, intercepts the shorted-out circuit.

2. Description of the Related Art

The connection terminals of the case for housing a battery are exposed so that they can be readily connected to their counterparts on the principal apparatus to which the battery supplies power. Therefore, if the connection terminals of the plus pole and the minus pole are accidentally short-circuited by coming into contact with an electroconductive object, a large current may flow in the shorted-out circuit, resulting in the overheating of the battery case. This might burn the user or even invite a fire. In view of this risk, various structures have been proposed to prevent short circuiting.

For instance, the Japanese Laid-Open Patent Application No. 53873/1988 (JP-A-63-53873) discloses a connecting terminal arrangement which connects, via relay terminals, connection terminals provided on a box, such as a battery case, to those of the principal apparatus to which the battery supplies power. This connecting terminal arrangement further has partitioning boards on both sides of the relay terminals. In this manner, when the box is separated from the principal apparatus, the partitioning boards prevent the connection terminals from coming into contact with each other even if an electroconductive object approaches the box.

The Japanese Laid-Open Utility Model Application No. 50447/1988 (JP-U-63-50447) discloses a structure to prevent short-circuiting by covering at least one of paired connection terminals when the battery case is not fitted to the principal apparatus to which the battery supplies power. Similarly, the Japanese Laid-Open Utility Model Application No. 62657/1990 (JP-U-02-62657) discloses a battery pack having a protective cover over the connection terminals.

Furthermore, the Japanese Laid-Open Utility Model Application No. 14361/1992 (JP-U-04-14361) discloses a short-circuit preventing apparatus having a lead switch within the power supply circuit of the battery box and a magnet within the principal apparatus to which the battery supplies power. This lead switch is usually kept open and is closed when the principal apparatus is fitted to the box, i.e. when magnetic force is given by the magnet.

Since all these examples of the prior art prevent the connection terminals from contacting each other by a mechanical structure, the two connecting terminals may become exposed if the contact preventing part is damaged or deformed. Therefore, accidental short-circuiting of the connection terminals cannot always be avoided.

Moreover, they require such extra parts as the relay terminals, protective cover and magnet, which make it necessary to provide a protruding part on the battery box. Furthermore, the magnet may affect internal circuits of the principal apparatus to which the battery supplies power.

SUMMARY OF THE INVENTION

An object of the present invention, therefore, is to provide an overcurrent preventing circuit capable of detecting any overcurrent flowing in the internal circuit of the battery case.

Another object of the present invention is to provide an overcurrent preventing circuit which, upon detection of any overcurrent flowing between the battery and the connection terminals, can intercept the connecting path between the battery and the connection terminals.

An overcurrent preventing circuit according to the present invention includes an overcurrent detecting circuit for detecting any overcurrent flowing in a closed circuit connecting a battery and connection terminals, and a switching circuit responsive to the detection output of the overcurrent detecting circuit for controlling the opening and closing of the closed circuit.

According to the present invention, if a pair of connection terminals are short-circuited to each other by any cause, the overcurrent detecting circuit will detect the overcurrent due to that short-circuiting and opens the switching circuit. Since this opening intercepts the circuit which electrically connects the battery and the connecting terminals, the overcurrent can be prevented from flowing in this circuit and it is made possible to avoid any accident which would otherwise result from the overcurrent.

BRIEF DESCRIPTION OF THE DRAWINGS

These and other objects, features and advantages of the present invention will become more apparent from the following detailed description when taken in conjunction with the accompanying drawings, wherein.

In the drawings, the same reference numerals denote the same structural elements.

DESCRIPTION OF THE PREFERRED EMBODIMENT

Figure 1:
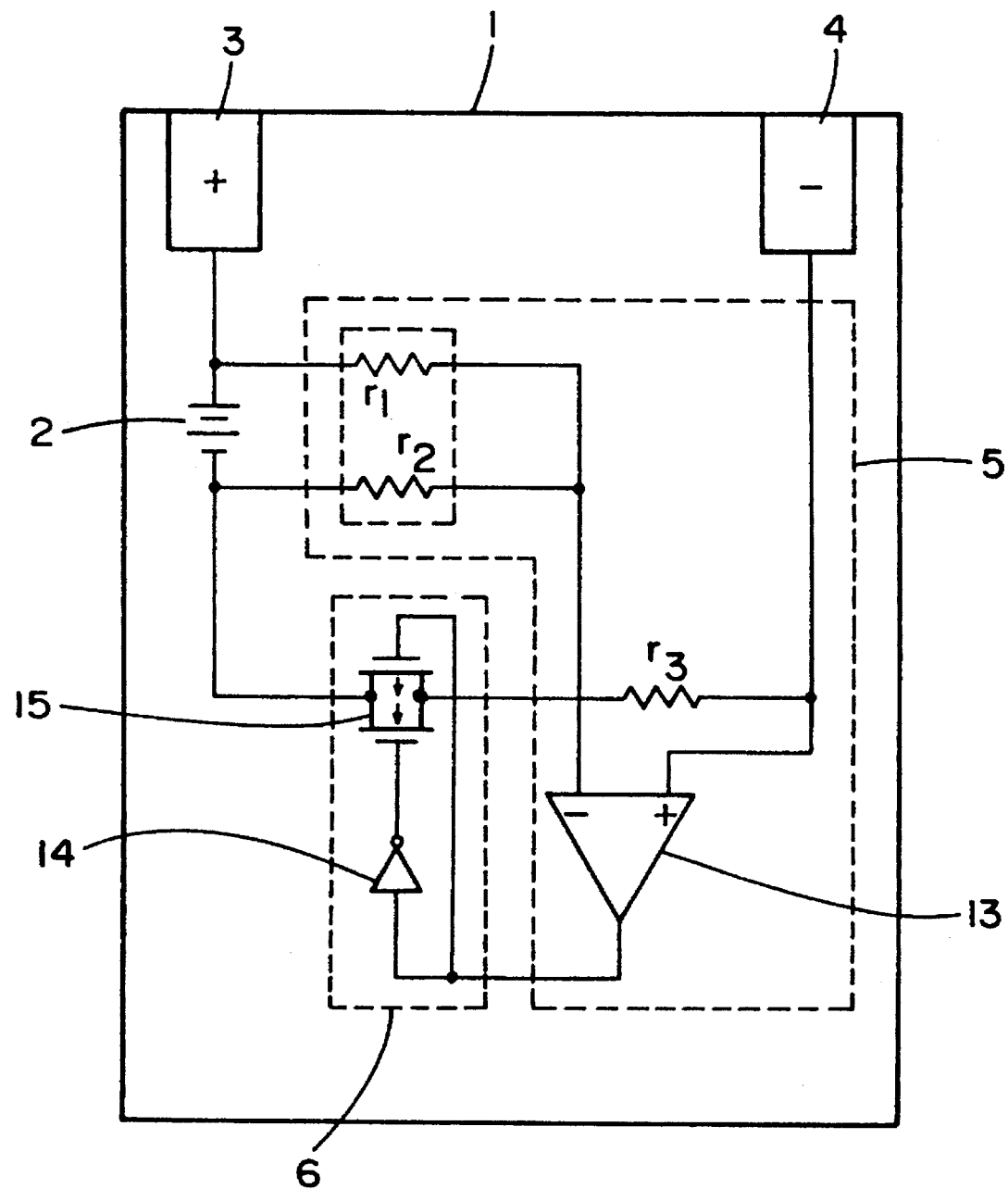
FIG. 1 is a block diagram of a preferred embodiment of the invention.

FIG. 1 is a block diagram of a preferred embodiment of the present invention. In FIG. 1, a case 1 for a battery pack or the like has a battery 2, a pair of connection terminals 3 and 4, an overcurrent detecting circuit 5, and a switching circuit 6. The connection terminals 3 and 4, electrically connected to the batteries 2, are exposed on the surface of the case 1. The connection terminals of this case 1, when fitted to a principal apparatus (not shown), e.g. a portable telephone, to which the power is to be supplied, come into contact with the power supply circuit of the principal apparatus. This causes electric power to be supplied to the power supply circuit of the principal apparatus. The overcurrent detecting circuit 5 detects any overcurrent flowing between the pair of connection terminals 3 and 4. The switching circuit 6 controls the electric connection between the battery 2 on the one hand and the connection terminals 3 and 4 on the other according to the detection result of the overcurrent detecting circuit 5. Thus the switching circuit 6, upon detection of any overcurrent by the overcurrent detecting circuit 5, intercepts the electric connection between the battery 2 and the connection terminals 3 and 4.

The overcurrent detecting circuit 5 preferably consists of resistors r1, r2 and r3 and a comparator 13. The resistors r1 and r2 are connected in series to the potentials of the two ends of the battery 2, and divides the two-end potentials. The resistor r3 is inserted between the connection terminal 4 of the minus pole and the battery 2. The uninverted input terminal of the comparator 13 is connected between the resistor r3 and the connection terminal 4 of the minus pole, and the inverted input terminal of the comparator 13 is connected to the connection point, or junction, between the resistors r1 and r2. The comparator 13 compares the fall voltage of the resistor r3 and the divided voltage of the resistors r2 and r3 and, if the former surpasses the latter, supplies the detection output signal to the switching circuit 6.

In the above-described embodiment, the voltage divided by the resistors r2 and r3 is used with a view to saving power consumption, but it is not necessarily required to use a divided voltage, but the battery voltage may as well be used as it is. If the battery voltage is supplied to the inverted input of the comparator 13, the resistance of the resistor r3 will increase. Therefore, the power consumption will increase.

The switching circuit 6 preferably has an inverter 14 and an analog switch 15. The analog switch 15 consists of a P-channel transistor and an N-channel transistor. The gate of the P-channel transistor is connected to the output end of the comparator 13, and that of the N-channel transistor, to the output end of the comparator 13 via the inverter 14. The sources and drains of the two channel transistors are connected between the battery 2 and the resistor r3.

Next will be described the operation of the present invention embodied in such a configuration.

If short circuiting takes place between the connection terminals 3 and 4 and an overcurrent flows in the overcurrent detecting circuit 5, the battery 2 and the connection terminals 3 and 4 will constitute a closed circuit. The overcurrent detecting circuit 5 detects the overcurrent flowing in this closed circuit, and supplies the detection output signal to the switching circuit 6, which, in response to this detection output signal, intercepts the electric connection between the battery 2 and the connection terminal 4. If no overcurrent is detected, the switching circuit 6 will maintain the closed circuit.

Now will be described the operation which takes places when the current flowing in the resistor r3, at a battery voltage of 5 V, is 1 A or less, for example. Supposing the resistances of the resistors r1, r2 and r3 are 4.89 MΩ, 0.11 MΩ and 0.1 Ω, respectively, when the case 1 is connected to the principal apparatus to which the power is to be supplied. The uninverted input voltage of the comparator 13 will be 0.1 V or less, and the inverted input voltage, 0.11 V. Accordingly, the output of the comparator 13 will be "Low", and that of the inverter 14, "High". At this time, the P-channel transistor is turned ON, and so is the N-channel transistor. Therefore the analog switch 15 is brought into continuity, and thereby enabled to supply a voltage externally from the connection terminals 3 and 4.

On the other hand, if the connection terminals 3 and 4 are short-circuited, for instance if the current flowing in the resistor r3 is 1.5 A, the uninverted input voltage of the comparator 13 will become 0.15 V, and accordingly the output of the comparator 13 will turn "High". Accordingly, the P-channel transistor is turned OFF, and so is the N-channel transistor because a "Low" level signal is supplied to its gate via the inverter 14. Therefore, the analog switch 15 will become open. This electrically intercepts the connection terminal 4 from the battery 2 to avoid short circuiting.

It is desirable that, as in the above cited example, the resistances of the resistors r1 and r2 be relatively high, and that of the resistor r3, relatively low.

Other examples of the switching circuit 6 include a delayed self-restoration type switch or a manipulated restoration type switch. The former would intercept the closed circuit in response to the detection output signal of the overcurrent detecting circuit 5 and, after the lapse of a predetermined duration following the extinction of the detection output signal, automatically close the switch. The latter would be caused by a restoring manipulation from outside to close the switch.

Figure 2:
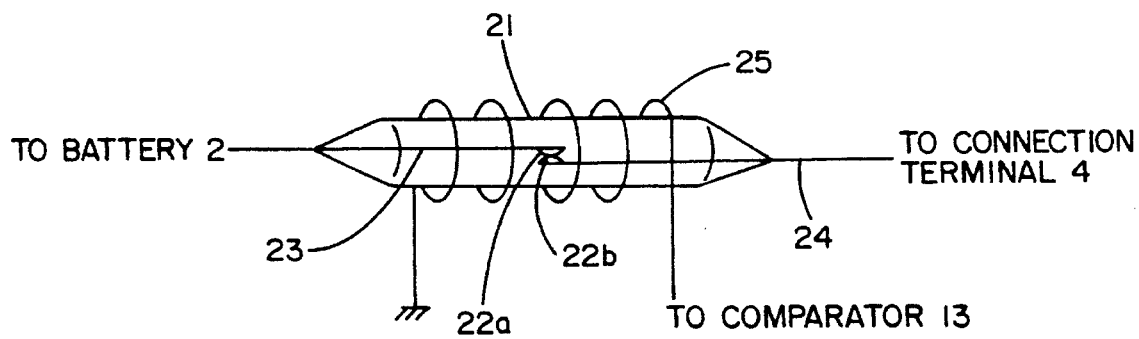
FIG. 2 is a diagram illustrating an alternative configuration of the switching circuit shown in FIG. 1.
Figure 3:
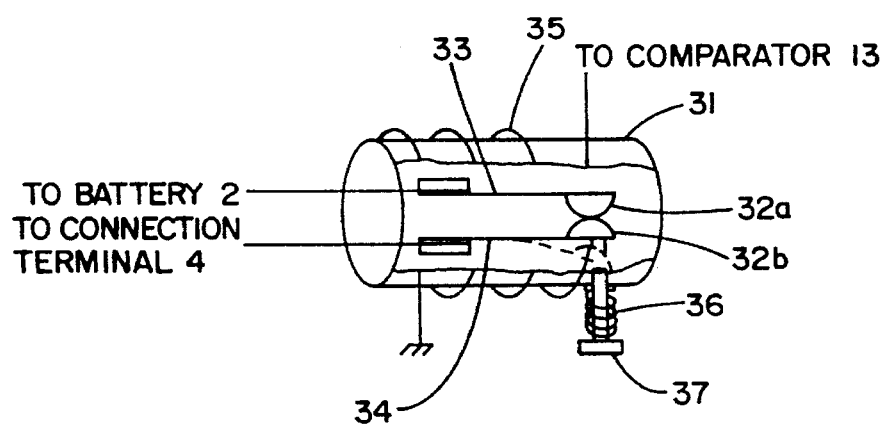
FIG. 3 is a diagram illustrating another alternative configuration of the switching circuit shown in FIG. 1.

FIG. 2 illustrates the configuration of the delayed self-restoration type switch and FIG. 3, that of the manipulated restoration type switch.

In FIG. 2, metallic leads 23 and 24, respectively having contacts 22a and 22b, are arranged within a glass tube 21. These metallic leads 23 and 24 are connected to the battery 2 and the minus pole connection terminal 4, respectively. Around the circumference of the glass tube 21 is wound a coil 25 which would generate a magnetic field with an overcurrent. One end of the coil 25 is connected to the output end of the comparator 13, while the other end is either grounded or connected to the connection terminal 4. The contacts 22a and 22b are normally in contact, and warped outward by the generation of heat to become open.

Thus, the metallic leads 23 and 24 in the glass tube 21 are heated by the overcurrent, and this heat warps the metallic leads. At the same time, a current flowing in the coil 25, i.e., the detection output signal, generates a magnetic field to separate the metallic leads 23 and 24 from each other. The resultant open state between the contacts 22a and 22b intercepts the electrically connected circuit between the battery 2 and the connection terminals 3 and 4. After the extinction of the detection output signal, i.e. when there is no longer an overcurrent, the magnetic field generated by the coil 25 disappears. As the heat is radiated from the glass tube 21 and the coil 25, the metallic leads 23 and 24 are restored after the lapse of predetermined duration. This brings the contacts 22a and 22b into contact with each other, and the closed circuit is automatically restored. The "predetermined duration" here means the time required for heat radiation.

In FIG. 3, metallic leads 33 and 34, respectively having contacts 32a and 32b, are arranged within a switch body 31. The contacts 32a and 32b are normally in contact. Around the circumference of the switch body 31 is wound a coil 35 which would generate a magnetic field with an overcurrent. The metallic leads and the coil are connected in the same manner as in the switch of FIG. 2. A manipulating button 37 is fitted via a spring 36 to the switch body 31. This manipulating switch 37 is normally kept away from the contact 32b of the metallic lead 34 by the elasticity of the spring 36.

Upon generation of heat by the metallic leads 33 and 34 in the switch body 31 due to an overcurrent, this heat warps the metallic lead 34 as shown by the waved line in the diagram. At the same time, a current flowing in the coil 35 generates a magnetic field to separate the metallic leads 33 and 34 from each other. The resultant open state between the contacts 32a and 32b intercepts the closed circuit. As the interception eliminates the overcurrent, the magnetic field generated by the coil 35 disappears. As there also works a force to restore the metallic lead, pressing the manipulating button 37 will return the metallic lead to its original position to bring the contacts 32a and 32b into contact with each other again to restore the closed circuit. Incidentally, the restoration can as well be automatically accomplished by a timer or the like after the lapse of the predetermined duration.

As hitherto described, according to the present invention, even if a pair of connection terminals are short-circuited, the electric connection between the battery and the terminals is immediately intercepted to prevent an overcurrent from being supplied to the closed circuit connecting the battery and the terminals and thereby to avoid the occurrence of any accident which would otherwise result from short circuiting.

While the invention has been described with reference to specific embodiments thereof, it will be appreciated by those skilled in the art that numerous variations, modifications and embodiments are possible and, accordingly, all such variations, modifications and embodiments are to be regarded as being within the spirit and scope of the invention.

What is claimed is:

1. An overcurrent preventing circuit, comprising:

an overcurrent detecting circuit for detecting any overcurrent flowing in a current path in which a battery and connection terminals are electrically connected; and a switching circuit, responsive to a detection output signal of said overcurrent detecting circuit, for controlling the opening and closing of said current path;

an analog switch inserted into said current path, in which a P-channel transistor and an N-channel transistor are connected in parallel, and said detection output signal of said detecting circuit is supplied to the gate of said P-channel transistor; and an inverter for supplying said detection output signal, which has been inverted, to the gate of said N-channel register.

2. The overcurrent preventing circuit, as claimed in claim 1, wherein said overcurrent detecting circuit detects any overcurrent generated by short circuiting of said pair of connection terminals.

3. The overcurrent preventing circuit, as claimed in claim 1, wherein said overcurrent detecting circuit comprises:

a first and a second resistor, connected in series to potentials of two ends of said battery, for dividing those potentials of said two ends to generate a divided voltage, a third resistor connected to an electric connection path between said battery and one of said connection terminals, and a comparator circuit for comparing a voltage drop in said third resistor and said divided voltage, and for supplying said detection output signal to said switching circuit in accordance with a result of comparison.

4. The overcurrent preventing circuit, as claimed in claim 3, wherein resistances of said first and second resistors are greater than that of said third resistor.

5. The overcurrent preventing circuit, as claimed in claim 3, wherein said comparator circuit intercepts said electric connection path when said voltage drop is higher than said divided voltage.

6. An overcurrent preventing circuit for a battery contained in a battery pack, comprising:

a battery pack having an internal circuit containing a battery and a pair of exposed connecting terminals connected to the terminals of the battery;

an overcurrent detecting circuit for detecting an overcurrent flowing in the internal circuit caused by a short circuit across said pair of connecting terminals, said overcurrent detection circuit including a voltage divider for providing a divided battery voltage and a comparator for comparing the divided voltage and a voltage drop across a resistor connected in series with the battery terminals; and a switching circuit, responsive to a detection output signal of said overcurrent detection circuit, for controlling the opening and closing of said internal circuit.

7. The overcurrent preventing circuit, as claimed in claim 6, wherein said switching circuit intercepts an electric connection between said battery and connection terminals, and closes said current path upon extinction of said detection output signal.

8. The overcurrent preventing circuit, as claimed in claim 7, wherein said switching circuit automatically closes said current path after the lapse of predetermined duration following the extinction of said detection output signal.

9. The overcurrent preventing circuit, as claimed in claim 7, wherein said switching circuit closes said current path by a restoring manipulation after the extinction of said detection output signal.

10. The overcurrent preventing circuit, as claimed in claim 8, wherein said switching circuit comprises:

a pair of metallic leads, inserted into said current path, each having a contact at one end;

a glass tube covering said metallic leads, and a coil provided around the circumference of said glass tube and connected to the output of said overcurrent detecting circuit and to the ground; and said contacts are opened and closed in response to said detection output signal.

11. An overcurrent preventing circuit, as claimed in claim 8, wherein said switching circuit comprises:

a pair of metallic leads, inserted into said current path, each having a contact at one end;

a glass tube covering said metallic leads, a coil provided around the circumference of said glass tube and connected to the output of said overcurrent detecting circuit and to the ground, and a manipulating button in contact with one of said contacts; and said contacts are opened in response to said detection output signal and closed by the pressure of said manipulating button.

12. The overcurrent preventing circuit, as claimed in claim 6, wherein said battery pack is to supply power to a portable communication apparatus.

* * * * *